United States Patent [19]

Winslow

[11] 4,453,868
[45] Jun. 12, 1984

[54] AIR-OPERATED, HYDRAULICALLY-CONTROLLED DRILLMOTOR

[75] Inventor: James C. Winslow, Carlsbad, Calif.

[73] Assignee: Winslow/McDowell, Inc., Carlsbad, Calif.

[21] Appl. No.: 289,826

[22] Filed: Aug. 3, 1981

[51] Int. Cl.³ .............................................. B23B 47/24
[52] U.S. Cl. ...................................... 408/138; 408/17; 408/137; 173/146
[58] Field of Search ................. 408/17, 129, 137, 138, 408/141, 142; 173/15, 19, 145, 146, 160; 408/6, 11, 121

[56] References Cited

U.S. PATENT DOCUMENTS

| | | | |
|---|---|---|---|
| 89,502 | 4/1869 | Prosser | 408/138 |
| 1,873,404 | 8/1932 | Hild | 173/146 |
| 2,375,991 | 5/1945 | Hoffar | 408/137 |
| 2,566,084 | 8/1951 | Esseling | 173/146 |
| 2,905,440 | 9/1959 | Gerentes | 173/146 |
| 2,909,949 | 10/1959 | Winslow | 408/10 |
| 2,910,895 | 11/1959 | Winslow | 408/10 |
| 3,583,822 | 6/1971 | Alexander et al. | 408/11 |

FOREIGN PATENT DOCUMENTS 21771 of 1915 United Kingdom .............. 173/145

Primary Examiner—William R. Briggs
Assistant Examiner—Daniel W. Howell
Attorney, Agent, or Firm—Duane C. Bowen

[57] ABSTRACT

Air-operated, hydraulically controlled portable drill-countersink tool automatically clamping to workpiece. A spindle attached to drill is connected to gearing from a motor by helical splines to withdraw the spindle, to counter spindle-feeding force, responsive to encountering increased torque due to increased resistance in drilling or countersinking. In a hydraulic cylinder for collet clamping a lower air pressure is converted to higher hydraulic pressure. When drilling depth is reached, drill feeding changes to drill withdrawal and that change is triggered by blocking of an air vent by a member traveling with the spindle. A lower drill speed during countersinking is achieved by a valve reducing air supply to the motor and change in that valve is also triggered by blocking of air vent by a member traveling with the spindle. The blades of the air motor do not change in extension when loaded and the motor has constant torque.

3 Claims, 17 Drawing Figures

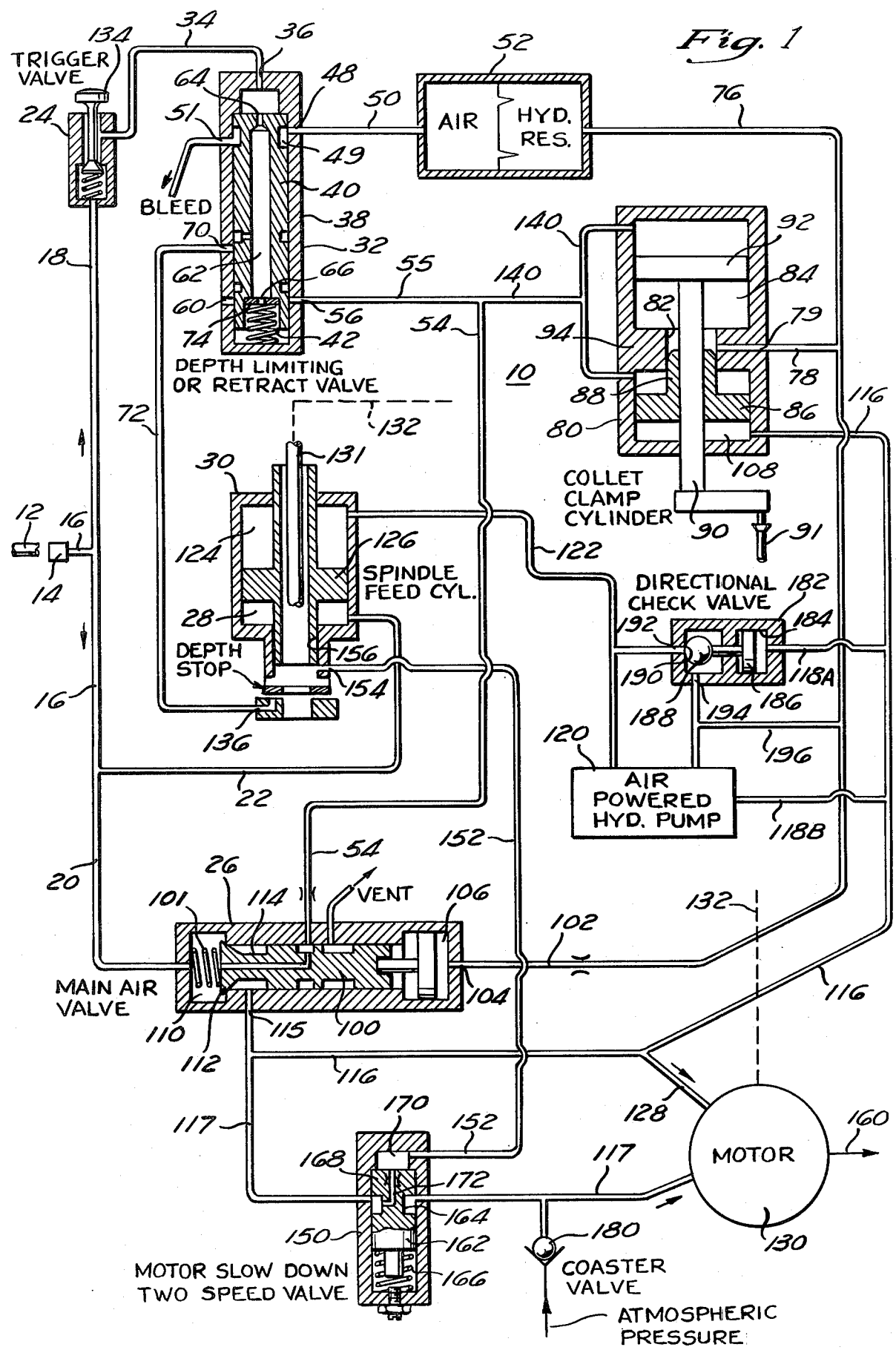

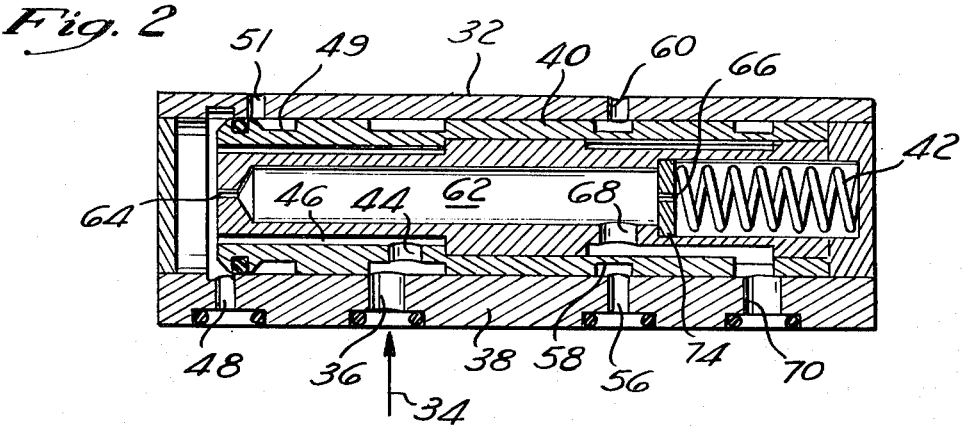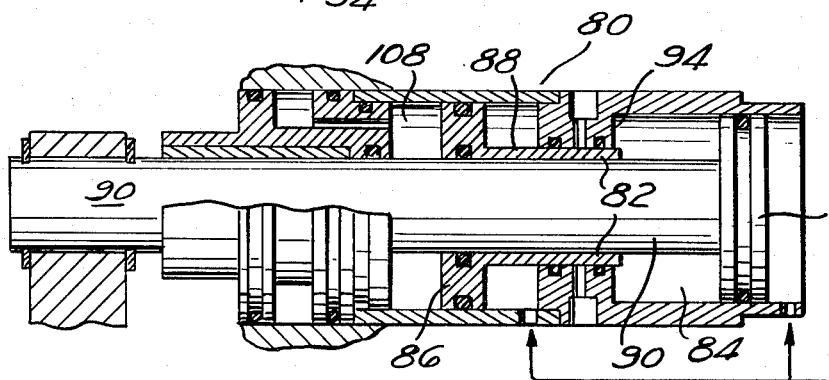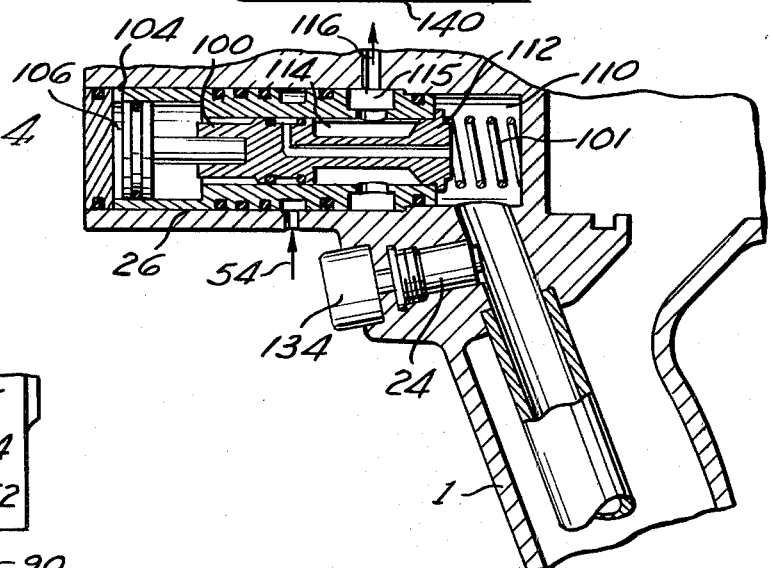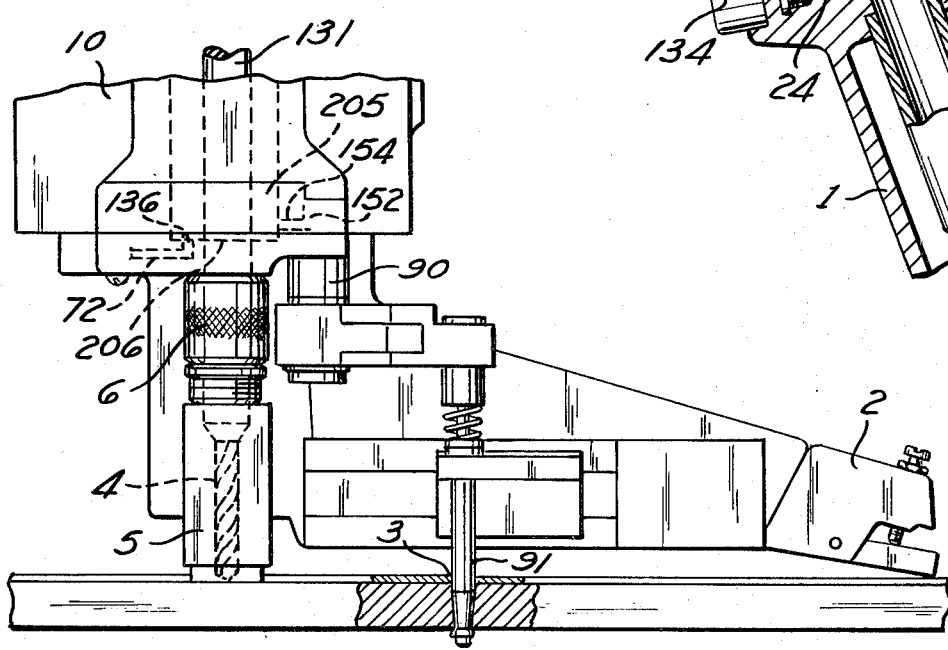

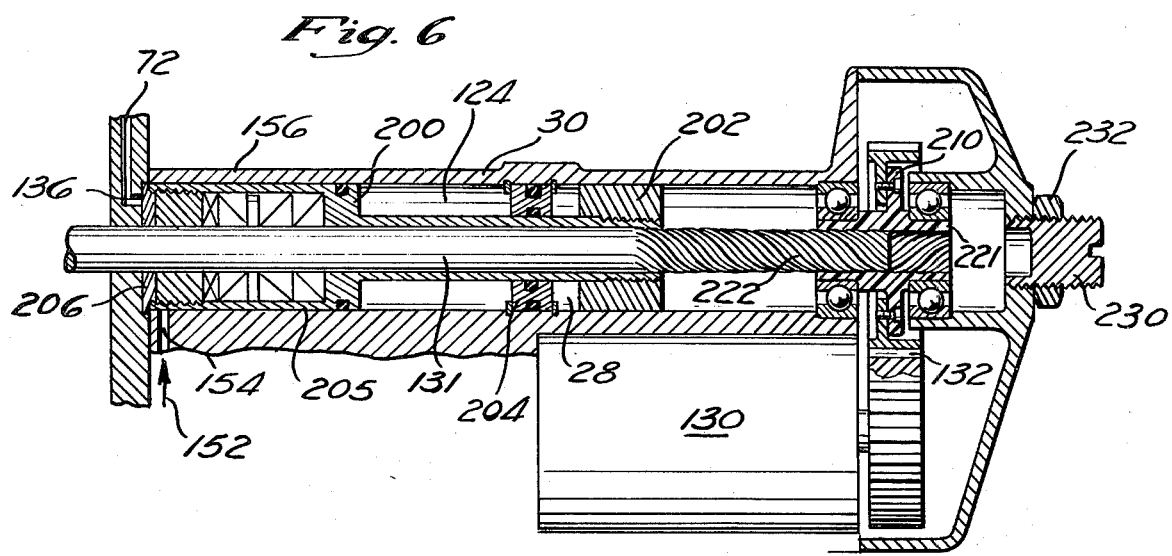
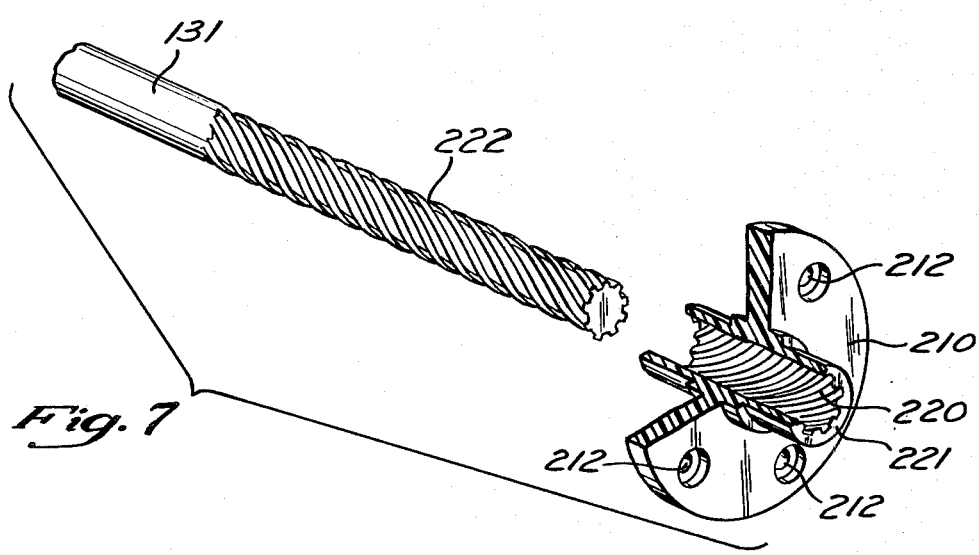
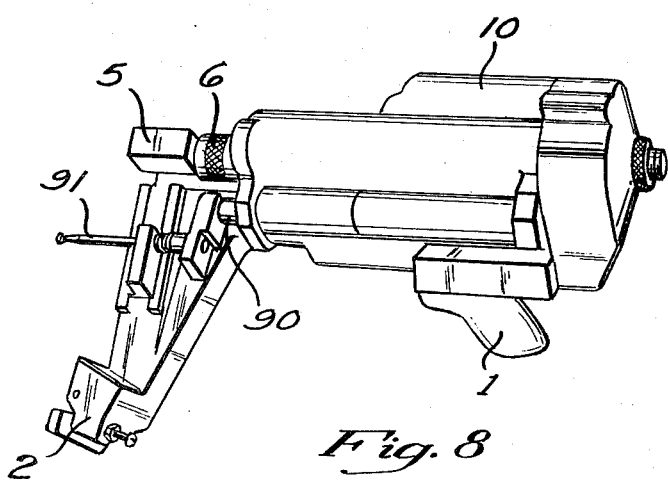

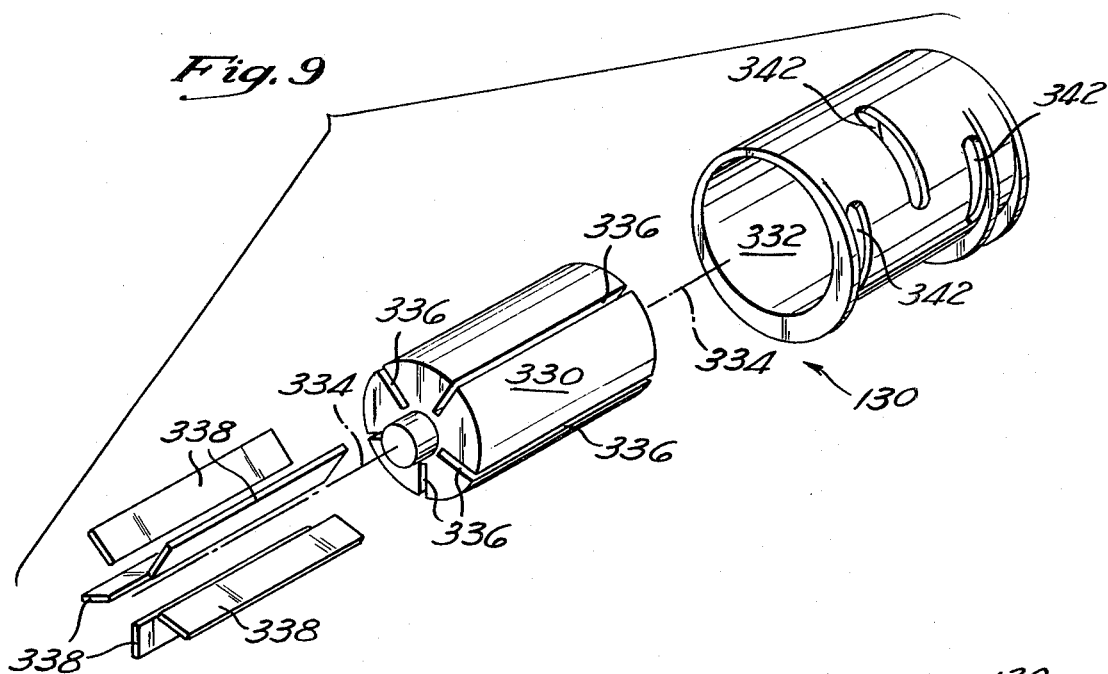
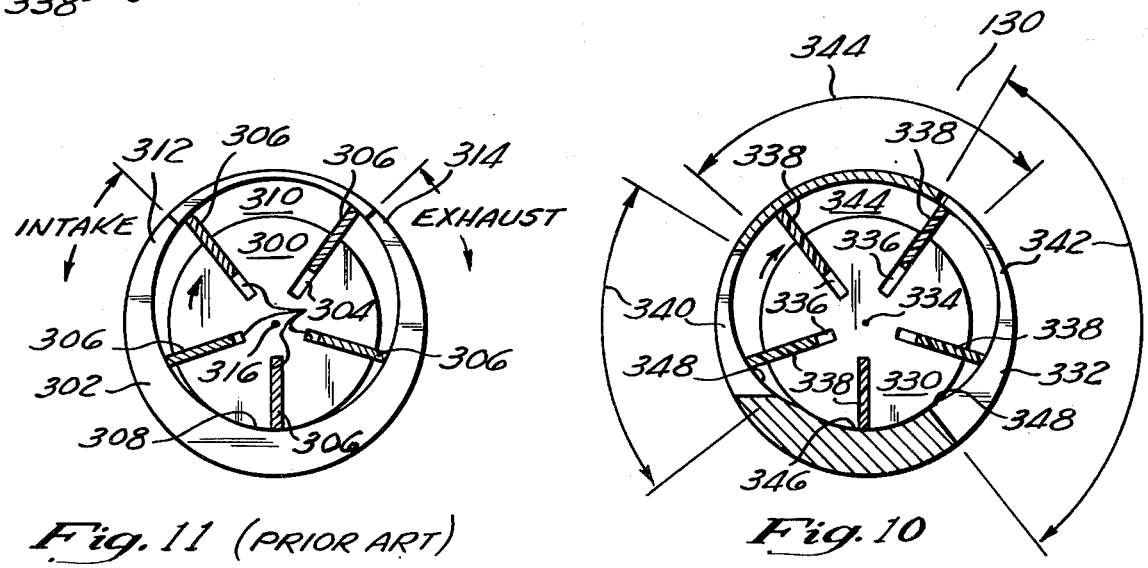
Fig. 11 (PRIOR ART)
Fig. 10
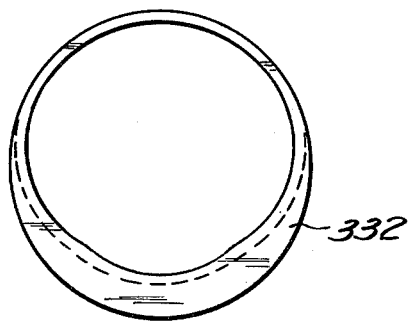
Fig. 12
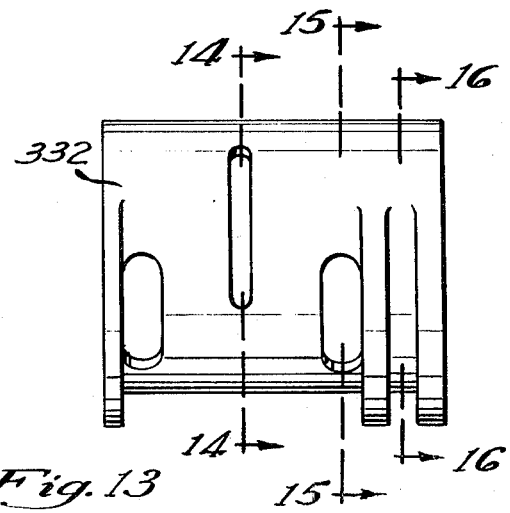
Fig. 13

AIR-OPERATED, HYDRAULICALLY-CONTROLLED DRILLMOTOR

BRIEF SUMMARY OF THE INVENTION AND OBJECTIVES

My invention relates to improvements in rotary tools such as drillmotors, and particularly in an air-operated, hydraulically controlled portable tool that automatically clamps to the workpiece or to a template and that drills and countersinks in one operation to very close tolerances. My invention especially relates to such a drillmotor for high speed drilling of aluminum. It is a general objective of my invention to improve that type of equipment.

Smoothness of drilling and countersinking is of particular importance in aircraft, especially in the aluminum skins thereof wherein aerodynamic smoothness is critical and in skins and other parts where surface irregularities may cause crack propogation or other fatigue. Another objective of my invention is to promote smoothness of bores and countersinks by various measures such as (1) relief of excessive drill or countersink torque (due to material changes encountered during drilling)—in effect to produce a thinner chip when torque increases, (2) to reduce spindle speed of rotation during countersinking, and (3) to continue drill rotation during withdrawal.

Further objectives include: to devise an effective, economical and reliable system for limiting drill torque; to improve the means to power collet clamping; to improve the system for relief of hydraulic pressure in spindle withdrawal; to improve on a control system for limiting depth of drilling, and to provide a reliable, economic, low maintenance, high quality, easy-to-operate tool.

Later in the specification I will indicate the prior art to the present development.

My invention will be best understood, together with additional advantages and objectives thereof, when read with reference to the drawings.

THE DRAWINGS

FIG. 1 is a diagram of the air and hydraulic system and related components in a specific embodiment of my invention.

FIG. 2 is a view partly in cross-section of a depth limiting or retract valve.

FIG. 3 is a view partly in cross-section of a collet clamp cylinder.

FIG. 4 is a view partly in cross-section particularly of a main air valve.

FIG. 5 is a partial elevational view of the work engaging side of the tool.

FIG. 6 is a view partly in cross-section of the spindle and associated parts.

FIG. 7 is a partial exploded perspective view of portions of the spindle assembly, with portions broken away and shown in section.

FIG. 8 is a perspective view of the tool.

FIG. 9 is an exploded perspective view of portions of the air motor.

FIG. 10 is a cross-section of the motor.

FIG. 11 is like FIG. 10 but of a prior art motor.

FIG. 12 is an end view of the motor housing.

FIG. 13 is a view of the motor housing from the exhaust side.

Figure 14:
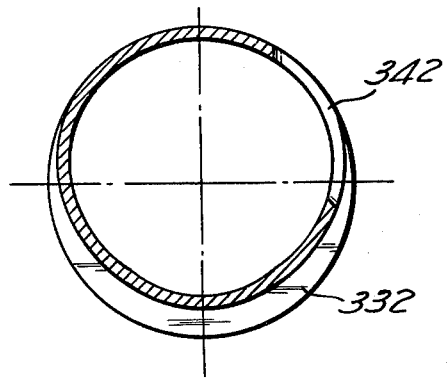
Figure 15:
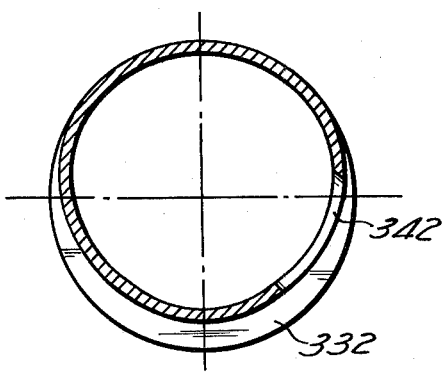
Figure 16:
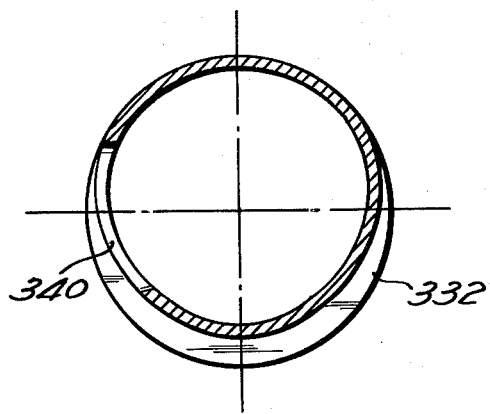

FIGS. 14, 15 and 16 are sectional views taken on lines 14—14, 15—15 and 16—16 of FIG. 13.

Figure 17:
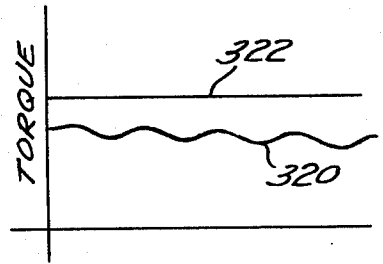

FIG. 17 is a graph comparing torque at a selected high rpm between the motor of the present invention and the motor of the prior art.

DESCRIPTION

My invention concerns an improved air-powered drill which is clamped to the work being drilled. I will describe the drill in various sections in this order:
(a) The air and hydraulic circuitry, valves and components
(b) The spindle assembly and torque limiting means The invention is an improvement over a type of air-powered drill disclosed in various prior patents including, among others, the following:
(i) U.S. Pat. No. 2,910,895, issued to James C. Winslow, entitled "Power Tool with Suction Foot"
(ii) U.S. Pat. No. 2,909,949, issued to James C. Winslow, entitled "Power Drill with Work Holding Device and Spacing Means"

The general configuration, the parts thereof, and the operation of the mechanism, not only has been shown in my prior patents, but also has been known in similar drills that have been marketed through the years, and will be obvious to those skilled in the art. I will not spend much attention in the drawings and description on old or obvious mechanisms. As a general reference, previous similar tools of my design have been known in the art as SPACEMATIC drillmotors and have been marketed by Winslow Product Engineering Corp., Omark Industries, Inc. and Deutsch Industries.

To indicate generally the configuration of my air-powered drill 10, FIGS. 8 and 5 are especially informative. Parts shown include a handle 1, an adjustable foot structure 2, and a collet 91 clamping at 3 a template directly to a workpiece. A combination drill and countersink 4 is threadedly connected to a spindle 131. Drill-countersink 4 extends through a drill guide block 5 and an adjustable sleeve 6 controls desired countersink depth.

AIR AND HYDRAULIC CIRCUITRY, VALVES AND COMPONENTS

The general air/hydraulic system will be described with special reference to the schematic diagram of FIG. 1. Air enters the tool 10 through a hose 12 connected thereto by a fitting 14 and communicating via entering main air line 16. Line 16 has branches 18, 20 and 22 to the finger operated trigger valve 24, the main valve 26 and the retract-end air chamber 28 of drill feed cylinder 30, respectively.

Referring particularly to FIGS. 1 and 2, retract (depth limiting) valve 32 is connected to trigger valve 24 by line 34 which enters entry air port 36 of retract valve cylinder 38. Retract valve 32 contains a spool 40 which can shift from end to end of cylinder 38 but normally is forced by compression spring 42 to the opposite end of cylinder 38. When trigger valve 24 is manually depressed, air flows from line 18 to line 34 and enters cylinder 38 through port 36. Referring especially to FIG. 2, air entering port 36 can communicate with the end of spool 40 that is at the left as viewed in FIG. 2 via internal port 44 and internal air passageway 46 in spool 40. Air pressure on that end of retract valve spool 40 overcomes spring 42 and forces spool 40 to the right to the position shown in FIG. 2.

At this point, as will be clear from FIG. 2, air can flow out of cylinder port 48, through line 50, to the air end of hydraulic reservoir 52 to pressurize the hydraulic circuitry. If spool 40 instead were in the initial position at the left in FIG. 2, flow of air out port 48 to reservoir 52 would have been blocked and reservoir 53 would have been vented through line 50, in port 48, around spool groove 49 and out cylinder port 51.

Also at this point, lines 54 and 55 from main valve 26 are vented past spool 40, by passing through cylinder port 56, around spool 40 in groove 58, and out cylinder port 60. The purpose of this venting of main valve 26 will be described later.

Spool 40 has a central passageway 62 from end to end thereof with end openings 64, 66 at each end. If there were no other outlet for air from passageway 62, as air pressure was applied to the left hand end of spool 40 in FIG. 2, air would pass through end opening 64, passageway 62, and end opening 66 and air pressure would equalize at opposite endsof spool 40, which would mean that the extra pressure of spring 42 would force spool 40 to the left hand position. At the beginning of the cycle, however, air is restricted passing through opening 64 causing pressure on end of spool to shift spool to position shown in FIG. 2 allowing air to pass from central passageway 62 out spool port 68 and out cylinder port 70, and through line 72. Later in the cycle, line 72 becomes blocked near the end of the drilling cycle, which means that air pressure will start building up on the right hand end of spool 40, as it passes through the metering end opening 66. When the pressure on the right hand end of spool 40 has built up sufficiently, spring 42 will force spool 40 to the left. Right hand metering end opening 66 is in a disc 74 that seals off the right end of spool. This metering restriction causes a delay in air flow therethrough, resulting in a short dwell of the drill spindle in its extended position before spool returns to its normal "retract" position.

To review, air pressure applied to retract (depth limiting) valve 32 moves valve spool 40 against return spring 42. Air pressure flows to both ends of valve spool 40 but is impeded by the restriction 66 at the spring loaded end. Air flows out of the spring loaded end through line 72 to the depth stop at the foot end of the tool. As the depth stop 138 is open initially, no pressure is developed at the spring end of valve spool 40 and spool 40 is held with return spring 42 compressed.

At this point, full air pressure is applied through line 50 to the air end of hydraulic reservoir 52, retract air supply is vented dropping retract air pressure to near zero, and air is spilling out through the depth stop vent, at the end of line 72, in the front piece at the end of the tool.

As hydraulic pressure rises in reservoir 52 due to the air pressure through line 50, oil flows through lines 76, 78 through port 79 to the collet clamp cylinder 80 shown particularly in FIG. 3. Cylinder 80 has a cylindrical passageway 82 between port 79 and the hydraulic fluid chamber portion 84 of collet clamp cylinder 80. An air operated piston 86 in collet clamp cylinder 80 has a cylindrical sleeve extension 88 that is adjustably positioned in cylindrical passageway 82. Initially, extension 88 does not block flow of oil from reservoir 52 into port 79, through cylindrical passageway 82, to chamber 84, until chamber 84 is filled. Later, air pressure acts to move air operated piston 86 so that its cylindrical extension 88 moves into position in cylindrical passageway 82 blocking flow in or out port 79. As air operated piston 86 continues to move through cylindrical passageway 82 and enters hydraulic chamber 84, it further pressurizes the oil in chamber 84. It will be understood because of the small area at the right hand end of cylindrical extension 88 versus the relatively large area subjected to air pressure on air operated piston 86, that a multiplier effect is obtained whereby relatively low air pressure on piston 86 will result in relatively high hydraulic pressure in chamber 84. In one prototype, the hydraulic pressure increased to about 700 psi from about 80 psi.

When hydraulic pressure initially is applied to chamber 84, central shaft or rod 90, to which collet clamping means is attached, is drawn to apply initial collet clamping force, although the collet clamping force later will become higher as hydraulic pressure in chamber 84 rises to as high as 700 psi, for example. One wall of chamber 84 is formed by a piston enlargement 92 of shaft 90. Piston 92 moves in the cylindrical bore of collet clamp cylinder 80 relative to the fixed opposite wall 94 to move shaft 90 relative to cylinder 80 to tense collet 91.

As initial hydraulic pressure is applied to the collet, and collet 91 is drawn up tightly, pressure in the hydraulic system rises. As that pressure approaches that of the air pressurizing the reservoir, spool 100 in main valve 26 is moved to the right against spring 101, as viewed in FIG. 4, by hydraulic pressure applied to the lefthand end of spool 100 from hydraulic reservoir 52, through line 76, through branch 102, through port 104, to hydraulic fluid chamber 106. This sequence of operation assures that the collet has drawn up tightly before air pressure is applied to air piston 86.

As soon as spool 100 of main valve 26 is moved to the right against spring 101 as viewed in FIG. 4, air can pass from main air supply line 16, through branch 20, to the air end 110 of main valve 26, past valve end 112 of spool 100, through annular relieved spool portion 114, out port 115, to line 116 to air chamber 108 of collet clamp cylinder 80 in order to provide very high clamping pressure to the collet 91 by applying air pressure to piston 86 resulting in hydraulic pressure to piston 92, thereby securing the collet and the foot to the workpiece.

Also with the main air valve spool 100 to the right as viewed in FIG. 4, air travels via line 116 and branch line 118 to hydraulic pump 120. Hydraulic pump 120 then raises the hydraulic pressure to a higher level, such as about 400 psi in a prototype. Hydraulic pump unit 120 includes a flow control valve in the pump unit. As the air pressure raises to the pump unit, a directional flow check valve in unit 120 shifts and this high pressure is directed through line 122 to the hydraulic fluid feed end 124 of the drill feed cylinder 30. Air feed through lines 16, 22 to the retract end air chamber of cylinder 30 restrains the piston 126 in cylinder 30 from overfeeding. The restraining force applied by air to piston 126 was about 90 pounds in a prototype.

Air is also fed through line 116 and through branch 128 to air motor 130 which powers rotation of the drill spindle or shaft 131, which is centered in cylinder 30, by gearing, etc., symbolized by dashed lines 132. (FIG. 6)

Air to drive motor 130 travels through two lines. One line is 116 and the other line 117. Line 117 passes through valve 150. Valve 150 has a vented line 152 leading to a port 154 through the lower end of the spindle cylinder housing 156. As the spindle piston approaches the last part of its stroke, this opening 154 is closed off by the piston resulting in a blockage of air escaping from the end of valve 150. This causes spool 162 in valve 150 to shift closing off air supplied through line 117 to motor 130 and results in slowing of motor 130 at the last short distance of its travel. In sequence, the drill spindle turns at high speed until the countersink portion of the cutter enters the work when the spindle speed is reduced to assure an improved finish in the countersink in the workpiece. Without this reduced speed, the cutter will have a tendency to leave a chattered or rough finish in the workpiece. It is understood that all the air to the air motor can pass through valve 150 when valve 150 has stops set to provide full flow when full open and a reduced flow in "closed" position.

As long as trigger valve 24 is held depressed by trigger button 134, drill spindle 131 will travel toward the work until it reaches its stop.

As the travel of spindle 131 "bottoms out", escaping air from the vent 136 in the footpiece is sealed off by the depth stop 138, air pressure backs up in line 72 and port 70. As air in retract valve 32 no longer can bleed off, air passes through end opening 66 and builds up to generally equalize pressure on opposite ends of retract valve spool 40, whereupon spring 42 forces spool 40 to the left in FIG. 2.

At this point, hydraulic pressure in reservoir 52 is vented through line 50, port 48, annulus 49 in retract spool 40 and vent port 51 in retract valve 32. Additionally, spool 40 in retract valve 32, in its movement to the left in FIG. 2, closes off cylinder port 56 from spool groove 58 and cylinder vent port 60 whereby escape of air from line 55 is blocked. One connection to line 55 is line 140 which connects to the opposite sides of hydraulic operated piston 92 and air operated piston 86 of collet clamp cylinder 80. Line 140 also connects to line 54 from main air valve 26 which now applies pressure through lines 54, 140 to pistons 86, 92 to release collet clamping. When spool 40 moves to the left, also depth stop line 72 to cylinder port 70 is blocked off.

Pressure in hydraulic reservoir 52 drops as spool 40 of retract valve 32 moves to the left in FIG. 2 and this means that hydraulic pressure applied through lines 76, 102 to hydraulic fluid chamber 106 of main valve 26 drops which permits spool 100 to return to "closed" position.

With main air valve 26 in "closed" position, air no longer passes through lines 116, 118 A & B to hydraulic pump 120 and the directional check valve 182 in pump 120 shifts to allow hydraulic fluid to pass back to reservoir from hydraulic chamber 124 of drill feed cylinder 30 through lines 122 through port 192 in valve 182 to line 196 and 76. The hydraulic fluid flow is induced by air pressure applied to retract air chamber 28 through lines 22, 16. When trigger button 134 is released, trigger valve 24 vents air from retract valve 32 through line 34.

To recapitulate the cycle of operation, air pressure applied to retract valve 32 which moves into mode 1 against return spring 42. Air pressure flows to both ends of valve spool 40 but through restrictions 64 and 66 at the spring loaded end. Air flows out of the spring loaded end to depth stop 138 in the foot end of the tool. As depth stop 138 is open in this feed mode, no pressure is developed to equalize force on that end of valve spool 40 causing spool to be held with return spring 42 compressed.

In this mode:
(a) Full air pressure is applied to reservoir 52.
(b) Retract air supply is vented dropping retract air pressure to near zero.
(c) Air is spilling out through depth stop vent 138 in the foot piece at the end of the tool.

As hydraulic pressure rises in reservoir 52, oil flows into collet clamp cylinder 80 and to main air valve 26. As pressure reaches approximately 50 psi and collet shaft 90 is drawn up by that pressure, spool 100 in main air valve 26 moves to open position.

In this mode of main air valve 26:
(a) The retract circuit is vented.
(b) Full air pressure is applied to lock piston 86 in clamp cylinder 80 and piston 86 moves to close off the port 79 leading from reservoir 52 and then moves further to displace hydraulic fluid in the clamp chamber 84 raising that pressure to about 600 psi and finally securing the collet and the foot to the workpiece.
(c) Air travels to hydraulic pump 120 which raises the hydraulic pressure from that approximating air supply pressure to approximately 400 psi. This hydraulic supply is controlled by a flow control valve in the pump unit 120. As the air pressure raises in pump unit 120, a directional flow check valve closes and the high pressure fluid is directed to the feed end 124 of feed cylinder 30. Full air supply pressure is applied to the retract end 28 of feed cylinder 30, thereby restraining piston 126 by a force of about 90# from over feeding.

So long as trigger button 134 is held depressed, the drill spindle 131 will travel downward until it reaches its stop.

As spindle 131 travel "bottoms out", escaping air from vent 136 in the footpiece is sealed off thereby causing pressure to equalize on both ends of retract valve 32. In this condition, retract valve spool 40 is moved by the return spring 42 into mode 2 position.

With trigger button 134 still depressed, and retract valve 32 in mode 2:
(a) Reservoir 52 pressure is vented.
(b) Vent to retract line 55 is closed.
(c) Depth stop line 72 is closed off.

As reservoir 52 pressure drops with retract valve 32 in mode 2:
(a) Hydraulic pressure holding main air valve 26 "open", drops allowing spool 100 in main air valve 26 to return to closed position.

With main air valve 26 in "closed" position:
(a) Air is cut off to pump 120 and to the piston 186 in the (directional check) valve in pump 120 allowing fluid to flow back to reservoir 52 past check ball 188, the fluid being forced back by the full air line pressure which is constantly applied to retract end 28 of feed cylinder 30.
(b) Retract air travels to clamp cylinder 80, thereby retracting the collet and releasing the tool from the work.

Trigger button 134 is released thereby venting air from retract valve 32, to complete the cycle.

To further explain the function of valve 150, the purpose is automatically to provide a higher speed for motor 130 by the motor receiving a larger supply of air during drilling and to provide a lower speed for motor 130 by the motor receiving less air during countersinking. Exhaust of air from motor 130 is indicated at 160. Valve 150 has a valve piece 162 movable between a first open position and a second closed or partially closed position. Valve piece 162 has porting 164 communicating with line 117 to pass air to motor 130 when valve piece 162 is in the first open position. Porting 164 is totally or partially out of registry with line 117 in the second "closed" position of valve piece 162. A spring 166 biases valve piece 162 towards the first open position. A piston 168 is connected to valve piece 162 and vent line 152 communicates with a chamber 170 receiving piston 168. A line 172 feeds air from line 117 through a restricted orifice to chamber 170. This line 172 is shown as being bored through valve piece 162 but it could be otherwise formed. When drill spindle 131 is advanced to countersinking depth, port 154 is closed, line 152 no longer vents chamber 170, air pressure through line 172 builds in chamber 170 thereby acting on piston 168, and valve piece 162 is moved to the second "closed" position, whereby motor 130 runs at a slower speed during countersinking.

A coaster valve 180 communicates with motor 130 through line 117 or otherwise. Valve 180 is essentially a check valve. Its purpose is to permit the rotor of motor 130 to coast or continue spinning after pressurized air is no longer fed to the motor. Coaster valve 180 is normally forced closed by super-atmospheric air pressure in line 117 but opens to admit atmospheric air when the rotor of motor 130 continues rotating after lines 116 and 117 are closed and creates a vacuum condition. The purpose is for the rotor of motor 130 to continue some rotation of spindle 131 after drilling and countersinking and during the brief withdrawal period, which the rotor will do by angular momentum if air starving of the rotor is avoided.

To further explain the valving associated with the air-powered hydraulic pump, a direction check valve 182 is associated with or integrated into pump 120. Valve 182 has an air compartment 184 connected to air line 116 and a piston 186 in compartment 184 is forced to the left as viewed in FIG. 1 by air pressure in compartment 184 to force a ball valve piece 188 against a seat 190 to seal a port 192. When compartment 184 is not being pressurized, piston 186 moves to the right under the force of hydraulic pressure on ball 190 whereby hydraulic fluid can pass through line 122, through port 192, past valve seat 190 and past ball 188, out port 194, through bypass line 196 to line 76 to return hydraulic fluid to reservoir 52. In this way, hydraulic pressure is relieved in spindle feed cylinder 30 and air pressure in compartment 28 can force spindle 131 to retract as hydraulic fluid is returned from compartment 124 to reservoir 52. Note the large area of air piston 186 relative to the small area of ball 188 exposed to hydraulic pressure in seat 190, whereby the lesser air pressure can withstand the greater return hydraulic pressure.

The desired drilling stroke length is accomplished by adjusting spindle stop 230 and spindle stop nut 232.

SPINDLE ASSEMBLY AND TORQUE LIMITING MEANS

Torque limiting means, including helical splines 220, 222, is incorporated into the spindle structure illustrated in FIGS. 6 and 7. The torque sensitive spindle controls drill-countersink feed rate. The torque sensing feature causes the drillmotor spindle 131 to be slowed in feed rate when excess torque is encountered. This, in effect, causes a thinner chip to be taken as the torque increases. The result is that ¼" diameter drills or ⅜" diameter drills can be driven at the same spindle speed. One model of this apparatus can accommodate up to ⅜" diameter drills with ½" diameter countersinks at a spindle speed of 4200 rpm. Spindle speeds can be as high as 8000 rpm for smaller drill sizes. The model had a maximum drilling stroke of 1½". The tool weighed 12 lbs. with the clamping foot 2 attached. The model can be generally described as an air-operated, hydraulically controlled portable tool that automatically clamps to the material, and that drills and countersinks in one operation to very close tolerances. A coolant normally will be used, but that system has not been specifically illustrated or described as the use of a coolant mist or the like is old in the art.

In the diagram of FIG. 1, the schematical presentation differs somewhat from the hardware shown in FIG. 6. Whereas a single piston 126 in a cylinder 30 is shown in FIG. 1, the equivalent structure is two O-ring sealed pistons 200, 202 secured to spindle 131 and a fixed wall 204 therebetween secured to the cylindrical bore 156 in the body of the tool, thereby forming air chamber 28 and hydraulic fluid chamber 124 in a different way. Piston 200 may be formed as part of a quill 205 closed at its outer end by a disc 206 which closes depth limiting port 136, blocking venting of line 72, when spindle 131, piston 200, quill 205 and disc 206 reach the position shown in FIG. 6. Note, also, that shortly before the FIG. 6 position, port 154 has been blocked by quill 205, thereby blocking venting of line 152, resulting in closing of valve 150 and the slowing of motor 130 during countersinking.

The gears 132 connecting motor 130 to spindle 131 include an interiorly helically splined driving member 210. Whereas member 210 could be a gear, it is shown in FIG. 7 to be a plastic part having openings 212 for securing to a metal gear. Member 210 has interior helical splines 220 in hub 221 which mate with exterior helical splines 222 on spindle 131.

The internal helical threads 220 in the driving member 210 and the exterior helical threads 222 on spindle 131 are directed to withdraw spindle 131 and drill-countersink 4, thereby producing a counterforce to the hydraulic pressure acting on piston 200 to feed spindle 131 relative to workpiece 3 as drill 4 encounters resistance to rotation in the workpiece. The counterforce is proportional to the resisting torque of drill 4 in workpiece 3. In other words, helical threads or splines 220, 222 are directed to withdraw spindle 131 and drill 4 so as to restrain forces feeding drill 4 as the drill or countersink encounters resistance to rotation in workpiece 3. The same principle can be applied to other rotary cutters. Change in torque may be caused by a metallurgical change in materials. It is easily seen that increased torque at the tool cutting edge, requires higher torque to drive the spindle. It is also well understood that excess torque can cause destruction of the cutter itself. Clearly this torque limiting feature can be seen to both reduce power requirements and to assure increased cutter life.

While this disclosure is shown applied to a "spacematic" or self holding tool type it is evident that the principle applies equally to drill presses, lathes, mills or other machines or tools employing drill holding and feeding means whether those feeding means embody power or hand methods. In this regard, my claims shall extend to all applications to which this torque sensitive principle applies.

Air/motor 130 has been improved to have a steady torque throughout its load range. This is due to constant blade area exposure. FIG. 11 shows the typical cross-section of an air motor in the prior art. The rotor 300 is disposed in an annular housing 302 and has a series of generally radially spaced slots 304 in which blades 306 are disposed. Rotor and housing abut at 308. In the operating area 310 between air intake 312 and air exhaust 314, the radius from the axis 316 of the rotor increases to the center of area 310 from intake 312 and decreases from the center of area 310 to exhaust 314. In cross-section, the interior of housing 302 is circular, on a different center from the rotor 300 cross-section. This means that blades 306 must extend and retract in area 310. Blades 306 commonly do not fully extend and there is air leakage past the blades. When loaded, blades 306 have considerable resistance to extension as they bind in slots 304. Centrifugal force on blades 306 plus air pressure applied to the bases of slots 304 are relied upon to extend the blades. Greater air loss occurs during any slowing of air motor 130 when centrifugal force is less. Rotor 300 and blades 306 may be made of plastic and there may be low friction between slots 304 and blades 306 so that blades 306 readily extend and retract when not loaded. Referring to the graph of FIG. 17, the lower wavy line 320 represents such prior art motors which not only may have about 20% loss of torque relative to the upper straight line 322 representing my improved air motor 130 but also fluctuates due to irregular extension and retraction of blades 306.

FIGS. 9-10 and 12-16 show my air motor 130. As with prior art rotors, rotor 330 has generally the shape of a cylinder. An annular housing 332 receives rotor 330, which rotates about the axis 334 of the cylinder. The rotor 330 has a series of radially equally spaced slots 336 each disposed in a plane extending through or close to the axis of rotation 334. A series of blades 338 are slidably mounted in slots 336 to wipe the internal surface of annular housing 332 under centrifugal force and by air pressure applied to the bottom of slots 336. Air intake means 340 and air exhaust means 342 are radially spaced relative to axis 334 and housing 332 is spaced from rotor 330 in the operating area 344 between air intake means 340 and air exhaust means 342 so that air can operate on extended blades 338 between intake 340 and exhaust 342.

The interior of housing 332 in cross-section has an arc throughout most of the blade operating area 344 which is of constant radius centered at axis 334 whereby blades 338 are fully extended when they become loaded and do not have to further extend under load thereby avoiding air leakage past blades 338 between air intake 340 and air exhaust 342. The angle of the arc of constant radius should be greater than the angle of arcuate spacing between blades 338 (which in the case of five blades is 72 degrees). In a prototype the arc of constant radius was one hundred degrees.

Rotor 330 should abut the interior of housing 332 in the blade fully retracted area 346 between exhaust 342 and intake 340. I prefer that the abutted area 346 should be an arcuate angle greater than the angle of the arcuate spacing between blades, and the arcuate angle was eighty degrees in a prototype. The interior of housing 332 in its transition areas 348 between blade operating area 344 and blade fully retracted area 346 is formed arcuate and fairing into the arcs in blade operating area 344 and blade fully retracted area 346.

My motor has its vanes or blades 338 fully extended before they are loaded. Therefore, blades 338 can be fully extended even at lower than normal rpm's and will perform at full torque at much lower speeds. In the prior art, when vanes or blades 306 pick up load, they tend to bind requiring considerable force to further extend them. A high rpm is required to try to provide sufficient centrifugal force and at best the results do not meet the results with my motor 130. Note in the graph of FIG. 17 that the torque line 322 is not only higher than the torque line 320 of the prior art but also line 322 is substantially straight. In the prior art, as the motor slows the centrifugal force becomes insufficient to sufficiently extend blades 306 and the prior art motor will stall at some lower speed. The torque line 320 is wavy because torque will vary depending on the extension of the blades under load.

Air intake and exhaust ports 340, 342 may be formed in different ways. I provide one central exhaust port 342 which is narrower than the other later opening ports 342 so that exhaust of air will be gradual to avoid excessive noise if too much air is exhausted too rapidly.

Having thus described my invention, I do not wish to be understood as limiting myself to the exact details disclosed but instead wish to cover those modifications thereof which will occur to those skilled in the art upon learning of my invention and which properly are within the scope of my invention.

I claim:

1. The improvement in means to drill a workpiece including a drill, including a spindle supporting and rotating said drill, including means to rotate said spindle, and including means to achieve feeding of said drill relative to said workpiece, comprising:

said means operative to rotate said spindle including a rotary driving member having an opening receiving said spindle and said spindle being connected to said driving member by means consisting of external helical splines on said spindle engaging with internal helical splines on said driving member, said splines having helixes spiraling in the same direction as the spindle direction of rotation to withdraw said spindle and said drill therewith producing a counterforce to the force feeding said spindle relative to said workpiece as said drill encounters resistance to rotation in said workpiece.

2. The subject matter of claim 1 in which said helical splines are pitched to produce counterforce proportional to the resisting torque of said drill in said workpiece.

3. The improvement in mean to operate on a workpiece including a rotary cutter including a spindle supporting and rotating said cutter, including means to rotate said spindle, and including means to achieve feeding of said cutter relative to said workpiece, comprising:

said means operative to rotate said spindle including a rotary driving member having an opening receiving said spindle and said spindle being connected to said driving member by means consisting of external helical splines on said spindle engaging with internal helical splines on said driving member, said splines having helixes spiraling in the same direction as the spindle direction of rotation to withdraw said spindle and said cutter therewith so as to restrain forces feeding said cutter relative to said workpiece as said cutter encounters resistance to rotation relative to said workpiece.

* * * * *